July 4, 1950        J. R. SCHOENBAUM        2,514,342
ELECTRONIC BRAKING MEANS FOR ELECTRIC MOTORS
Filed Aug. 22, 1947        3 Sheets-Sheet 3

INVENTOR
Joseph R. Schoenbaum
BY L. Malcolm Oberlin
ATTORNEY

Patented July 4, 1950

2,514,342

UNITED STATES PATENT OFFICE 2,514,342

ELECTRONIC BRAKING MEANS FOR ELECTRIC MOTORS

Joseph R. Schoenbaum, Roseland, N. J., assignor to Martin Elevator Company, Inc., New York, N. Y., a corporation of New York Application August 22, 1947, Serial No. 770,018

22 Claims. (Cl. 318—212)

This invention relates to braking and control systems for polyphase alternating current motors and to a method of braking such motors.

This invention further relates to an elevator control system embodying my novel braking circuits and to electronic control of the application of braking current.

Heretofore, electric braking of electric motors has been effected either by supplying alternating current to the motor windings in reverse phase or by supplying direct current to the motor windings. The application of alternating current to the windings, which is known in the art as "plugging," is disadvantageous in that means must be provided to disconnect the power source from the motor at the precise time the motor stops. If this is not done, the rotating field established by the reversed phase current will cause the motor to rotate in the opposite direction. The application of direct current to the motor windings to cause armature drag is liable to overheat the motor and it is difficult to obtain sufficient torque to stop the motor within a reasonable time.

In accordance with the present invention, the disadvantages of these systems are eliminated by applying rectified alternating current to a plurality of the motor windings in phase opposition to the current impressed thereon by the ordinary power supply circuits. This produces an oscillating field in the motor windings rather than a rotating field or a steady direct current field and I have found that this oscillating field is extremely effective in stopping the motor. There is no tendency for the motor to rotate in the opposite direction for the rectified braking current cannot cause the reversal of polarity in the motor windings necessary to initiate rotation of the armature.

Although, as stated, there is no reversal of polarity in the braking current, nevertheless the rectified alternating current, which has a distorted alternating current wave form, produces an effect entirely different than ordinary direct current.

I believe that the currents produced in the motor windings by the distorted alternating current wave form oppose each other and thereby provide an additional load tending to slow down and stop the motor armature, although my invention is not to be limited by theoretical considerations. This belief is verified by the fact that application of rectified alternating current to only one winding has little or no braking effect. In fact, in such case, the motor may tend to act as a synchronous motor and continue to run at its original speed. However, when rectified alternating current is applied to a plurality of windings in phase opposition to the ordinary supply circuits, there is an immediate braking action and the braking torque is substantially greater than that produced by applying direct current to the windings. The oscillating field set up by the distorted alternating wave form is equivalent to an intermittent rotating field which, however, is restricted to 180 electrical degrees and has the same effect upon the armature as a rotating field, except that it cannot initiate armature rotation.

The novel braking system of this invention is readily adaptable to elevator control systems particularly due to its flexibility and high torque stopping action. The braking current is applied to the motor in pulses and the duration of these pulses may be readily controlled to vary the average braking current. Accordingly, if desired, a small average current may be applied to the motor at the start of the braking cycle and thereafter the average current may be progressively or exponentially increased as the braking cycle proceeds. This is very desirable to prevent damage to the motor shaft or coupling means by abrupt application of full braking torque. Alternatively, the average braking current may be increased or decreased throughout the entire braking cycle to compensate for load variations caused, for example, by changes in the number of elevator passengers. Finally, the control system for the braking apparatus is readily adaptable to conventional motor and elevator control apparatus.

It is an object of the invention to provide an improved, electronically controlled braking system for polyphase alternating current motors in general and particularly for elevator motors.

It is another object of the invention to provide a novel method for braking a polyphase electric motor.

It is a still further object of this invention to provide a controllable braking apparatus capable of handling a wide variety of electric motor braking problems at minimum cost, and to accomplish more satisfactory braking of electric motors over a wide variation of motor size and load.

An additional object is to provide means for more quickly stopping rotation of large polyphase electric motors than previous methods have been able to accomplish.

The invention further contemplates the provision of an electronically controlled braking system capable of responding to control functions resulting from variations in response of motor and load in order to more accurately govern the entire system so as to achieve more predictable response than has previously been possible and to result in more accuracy in stopping a variable load, particularly with reference to elevator car braking.

A further object is to provide a braking system having a minimum of moving parts which might wear and cause improper operation.

An additional object is to provide a braking system in which the various components are compact and of small size yet have a wide margin of safety, and in which the various parts can be operated far below their rated capacity without incurring excessive cost for oversize components.

A further object is to avoid the use of highly specialized precision machine parts by using components well known and standard in the art of industrial control.

Various other objects, advantages and features of the invention will become apparent from the following detailed description taken in conjunction with the accompanying drawings, in which:

Fig. 6 is a schematic view illustrating a feature of the invention.

Figure 1:
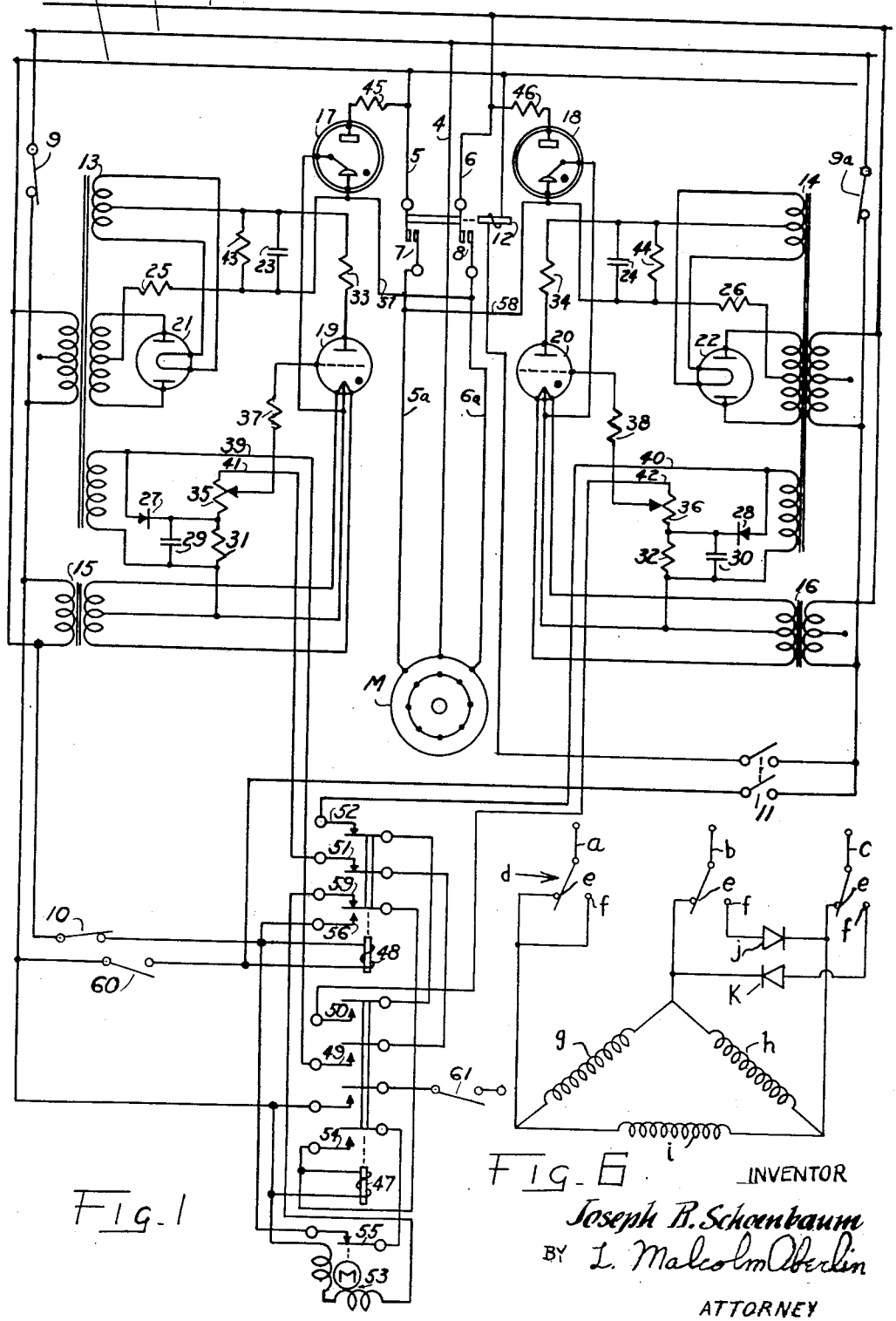
Figure 1 is a schematic circuit diagram of the novel control and braking system.

Referring now to the drawings in detail and particularly to Fig. 1, a polyphase alternating current motor M has its windings connected to three phases 1, 2 and 3 of a polyphase alternating current source by conductors 4, 5 and 6. In the example shown, the motor M is a three phase induction motor and the current source is a three phase delta power supply line but the invention is applicable generally to polyphase motors and to star or other types of connections, as will become apparent from the following description. The described power supply circuits are controlled by the contacts 7, 8 of a relay 12 which, when deenergized, interrupts the current flow through conductors 5 and 6. When relay 12 is energized, it will be apparent that the windings of the motor are connected to the respective phases of the power supply for normal operation of the motor.

The coil of relay 12 is controlled by a main switch 11 and a normally closed auxiliary switch 9a, current being supplied to the coil from one phase of the power supply when both switches are closed.

In accordance with the invention, rectified alternating braking current is supplied to a plurality of the windings of motor M in phase opposition to the current supplied by the power supply circuit 4, 5 and 6. To this end, conductor 1 is connected through a dropping resistor 45 to the plate of an igniter controlled mercury pool rectifier tube 17 and the cathode of tube 17 is cross connected by a conductor 57 to the portion 6a of lead 6. Similarly, conductor 3 is connected through a dropping resistor 46 to the plate of an igniter controlled mercury pool rectifier tube 18, the cathode of which is cross connected by a conductor 58 to the portion 5a of lead 5.

It will be apparent that the connections between conductors 1, 3 and the motor windings through the rectifiers 17, 18 are reversed, as compared with the connections made through contacts 7 and 8. The rectifier circuits, therefore, reverse the phase of the current applied to motor M and the rectifier circuits are connected in phase opposition with the corresponding power supply circuits.

The rectifier circuit is shown in a simplified form by Fig. 6 wherein three phase current is supplied from conductors $a$, $b$ and $c$ through a switch $d$ having a running position $e$ and a braking position $f$ to the respective junctions between the windings $g$, $h$ and $i$ of a three phase motor. With the switch in position $e$, three phase current is supplied to the motor windings in the usual manner to cause the motor to run in a forward direction. With the switch in position $f$, no change is made in the connection of conductor $a$ to the motor windings. However, conductor $b$ is connected through a rectifier $j$ to the junction between windings $h$, $i$ rather than to the junctions between windings $g$ and $h$. Similarly, conductor $c$ is connected through a rectifier $k$ to the junction between windings $h$ and $i$. Accordingly, when the switch is moved to position $f$, the phases of the currents supplied to two of the motor windings are interchanged, and these phases are rectified to provide pulsating braking currents which cause braking action until the motor stops and thereafter resist movement of the motor armature responsive to externally supplied mechanical forces. It will be noted that the connection of conductor $a$ to the motor windings is unchanged by actuation of switch $d$.

Assuming that relay 12 is deenergized, if the igniter of tube 17 is energized at a time when the plate of the tube is positive, rectified current will be applied to the motor through conductor 1 until the plate voltage of the tube becomes negative, at which time the tube will become non-conductive until the igniter circuit is again energized. As will be more fully explained hereafter, when the braking system is operated, the igniter of tube 17 is actuated during the positive part of each alternating current cycle and the tube is then conductive until the negative part of the cycle. Accordingly, during the braking cycle, a rectified alternating current flows through tube 17, conductors 6a, 57 and the motor windings. Similarly, during the braking cycle, rectified alternating current flows through tube 18, conductors 5a, 58 and the motor windings. This rectified alternating current flowing, in reverse phase, through the motor windings establishes an oscillating field which quickly brings the motor to a stop and has no tendency to cause the motor to rotate in a reverse direction.

It is important that at least two rectifier circuits be utilized and that these circuits be connected in phase opposition to their corresponding power supply circuit. If only one rectifier circuit is utilized, little or no braking action will be obtained and the motor may even continue to run as a synchronous motor instead of stopping.

As previously indicated, the mercury tube 17 is energized during the positive portion of each alternating current cycle when braking action is desired. To this end, the igniter of the tube is connected to the cathode of a gas filled triode 19 which receives filament current from a transformer 15 connected to one phase of the alternating current power supply. The plate of the triode 19 is connected through a dropping resistor 33 to one side of a condenser 23, the other side of which is connected to the cathode of the mercury pool tube 17. The condenser 23 is charged by a conventional power supply including a transformer 13, the primary circuit of which is connected through a normally closed switch 9 to one phase of the alternating current supply. The conventional power supply further includes a dual diode rectifier tube 10 having the plates thereof connected to the ends of the high voltage secondary winding, the center tap of which is connected through a dropping resistor 25 to the negative side of condenser 23. The cathode of tube 21 is connected to a low voltage secondary winding of transformer 13, the center tap of which is connected to the positive side of condenser 23. A bleeder resistor 43 may, if desired, be connected in shunt with condenser 23.

When the gas tube 19 becomes conductive, the condenser 23 discharges through resistor 33, the low resistance path between the plate and cathode of gas tube 19, and the igniter-cathode circuit of mercury pool tube 17. Thereupon, tube 17 becomes conductive and, if its plate is positive, current flows in the plate circuit thereof until the next succeeding negative portion of the alternating current cycle.

The grid of gas tube 19 has impressed thereon an alternating current component and a direct current component to cause the tube to become conductive during each cycle of the braking period. For this purpose, the grid is connected through a dropping resistor 37 to the arm of a potentiometer 35, one terminal of which is connected to a conductor 41 and the other terminal of which is connected through a resistor 31 to the cathode of gas tube 19. A direct current component is impressed upon resistor 31 and a condenser 29 in shunt therewith by a circuit including a secondary winding of transformer 13 and a rectifier 27. This direct current component biases the grid of tube 19 beyond its cut off value and normally prevents the tube from becoming conductive. When the circuit between conductors 39 and 41 is closed, an alternating current component is superimposed upon the direct current component by a circuit including the lower secondary winding of transformer 13, conductors 39 and 41, the upper portion of potentiometer 35, dropping resistor 37, and the grid and cathode of tube 19.

The circuit components are so adjusted that the direct current cut off bias on tube 19 is overcome by the alternating current component during the positive portion of each alternating current cycle, provided that the circuit between conductors 39 and 41 is closed. Each time this occurs, the gas tube 19 becomes conductive, thereby discharging condenser 23 which produces a triggering pulse to initiate operation of the mercury pool tube 17. After the discharge of the condenser, current immediately ceases to flow in the igniter circuit of tube 17 and the plate circuit of tube 19 thereby permitting the grid of the latter tube to regain control. However, rectified current continued to flow through tube 17 and the associated rectifier circuit until the next succeeding negative portion of the alternating current cycle. In this connection, it will be noted the plate circuit of gas tube 19 and the igniter circuit of mercury tube 17 can be energized only once during each cycle. This results from the fact that, once condenser 23 is discharged, it is comparatively slowly recharged by the associated power supply and does not reach a potential sufficient to energize the igniter circuit until shortly before the following positive alternating current cycle.

Thus, when the circuit between conductors 39 and 41 is closed, a pulse of current passes through the rectifier 17 and its associated circuit during each cycle of alternating current, these pulses constituting a flow of rectified alternating current from one phase of the alternating current supply to the motor windings. When the circuit between conductors 39 and 41 is open, the tube 19 is continuously biased beyond cut off with the result that tube 19 does not become conductive and no current flows through rectifier 17.

Figure 5:
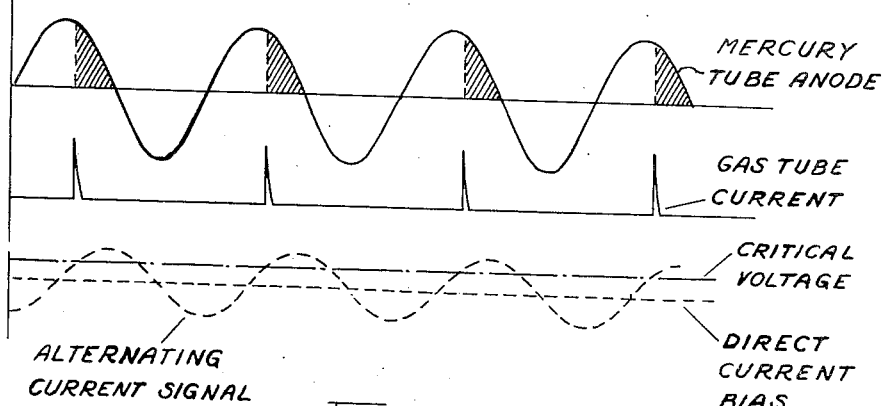

The average current flowing through rectifier 17 may be readily varied by controlling the phase relationship between the alternating current supply and the triggering impulses applied to the grid of tube 19. Thus, referring to Fig. 5, if the tube 19 is triggered at the moment the mercury tube anode becomes positive, current will flow in the rectifier circuit throughout the entire positive part of each alternating current cycle. However, if the tube is triggered at the middle of the positive cycle, as shown, current will flow through the rectifier for only one-half of the positive portion of each cycle, as indicated by the shaded portion of the mercury tube anode graph, Fig. 5. Thus, the average braking current over a plurality of cycles will be only 50% of the maximum average current.

The part of the cycle at which the triggering impulse occurs may be readily controlled by varying the ratio of the alternating current and direct current components applied to the grid of tube 19. This is accomplished by varying the setting of potentiometer 35, movement of the arm upwardly, Fig. 1, increasing the ratio of the alternating current component to the direct current component and movement of the arm downwardly decreasing said ratio. The effect of this adjustment may best be understood by a consideration of the lower graph of Fig. 5, where the dot dashed line represents the critical grid voltage at which the tube 19 becomes conductive, the straight dashed line represents the direct current component impressed on the grid and the sine wave represents the combined direct and alternating current components.

As shown, the potentiometer 35 is set in an intermediate position, the grid voltage rising above the critical value at approximately the middle of each positive cycle to cause the gas tube to become conductive and initiate operation of the mercury tube. Assuming that the potentiometer arm were moved upwardly with resultant increase in the alternating current component and decrease in the direct current bias, the sine curve would be shifted upwardly causing its point of intersection with the critical voltage line to move leftwardly. As a result, the gas tube would be triggered earlier in each cycle and the mercury tube would be energized for a greater proportion of each cycle, thereby increasing the average current passing through the rectifier circuit. Conversely, downward movement of the potentiometer arm would decrease the alternating current component, increase the direct current bias, and shift the sine curve downwardly, causing its point of intersection with the critical voltage line to move rightwardly. As a result, the gas tube would be triggered later in each cycle and the mercury tube would be energized for a lesser proportion of each cycle, thereby decreasing the average current passing through the rectifier circuit.

From the foregoing description, it will be apparent that the grid of gas tube 19 functions as a voltage responsive control element which serves to initiate operation of the rectifier means at a predetermined point in each alternating current cycle. In the example shown, the rectifier means includes the gas tube 19 and the mercury tube 17 together with the associated power supply circuits. In this circuit, the plate circuit of tube 19 has insufficient power capacity to handle the rectified current necessary to brake the motor and the mercury tube 17 functions essentially as a relay to permit the use of heavy braking currents. However, in installations where only relatively small braking currents are needed, the rectifier means controlled by the voltage sensitive grid may include only the gas tube 19 or its equivalent. It will be apparent that gas tube 19 may act as a rectifier since current can flow in only one direction therethrough. In such an installation, the plate of tube 19 might be connected directly to the alternating current supply and its cathode to the motor winding. Various other equivalent circuits and components for the rectifier means will suggest themselves to those skilled in the art and are included within the scope of the invention.

A control and braking circuit similar to that described in connection with mercury tube 17 is provided for mercury tube 18. The igniter circuit for tube 18 includes the exciter and cathode thereof, a condenser 24, a dropping resistor 34, and the cathode and plate of a gas tube 20. The power supply for charging condenser 24 includes a transformer 14 energized by the polyphase power supply, a dual diode rectifier 22 together with resistors 26 and 44. The grid circuit of gas tube 20 includes a dropping resistor 38, a potentiometer 36, a resistor 32, a condenser 30, a rectifier 28, and a secondary winding of transformer 14. Filament power for gas tube 20 is supplied by a transformer 16 connected to one phase of the power supply. When the circuit is closed between conductors 40 and 42, the gas tube 20 is cyclically energized as described in connection with gas tube 19 to cause passage of rectified alternating current through mercury tube 18 and its associated rectifier circuit. When the circuit between conductors 40, 42 is open, cut off bias is continuously applied to gas tube 20 and mercury tube 18 is disabled.

The circuits between conductors 39, 41 and 40, 42 are controlled by relay means including a relay 47, a relay 48, main switch 11, and a timer 53. This relay control means provides a braking cycle of predetermined length following each period of motor operation. The cycle of relay operation is as follows: When main switch 11 is closed, relay 12 is energized, causing the motor to start, and a circuit is completed from conductor 2 through the coil of relay 48 and switch 10 to conductor 1. This energizes relay 48 and closes contacts 56 to apply current from conductor 1 to the coil of relay 47 which coil is, in turn, connected to conductor 2. This energizes relay 47 which establishes a holding circuit through contacts 54, and the normally closed contacts 55 of timer 53.

When it is desired to stop the motor, main switch 11 is opened, thereby deenergizing relay 12 and interrupting the supply circuit of the motor. Responsive to the opening of switch 11, relay 48 is deenergized but relay 47 remains closed, due to the described holding circuit. This initiates a timed braking period, during which the circuit between conductors 39, 41 is closed through contacts 49, 51 and the circuit between conductors 40, 42 is closed through contacts 50 and 52. As a result, the tubes 19, 20 are cyclically triggered throughout the braking period and rectified alternating current passes through the mercury tubes 17, 18 to the motor windings.

With relay 47 closed by its holding circuit, the opening of relay 48 supplies current to the timer 53 through contacts 59, 54 and 55. After the timer has run for a predetermined braking period, timer contacts 55 are opened thereby breaking the timer circuit and the holding circuit of relay 47. The resultant deenergization of relay 47 breaks the circuits between conductors 39, 41 and conductors 40, 42 thereby disabling gas tubes 19, 20 and mercury tubes 17, 18 which stops the flow of rectified braking current. Since relays 47 and 48 are both open, the circuit is now in readiness for a new cycle of operation to be initiated by closure of main switch 11.

Figure 3:
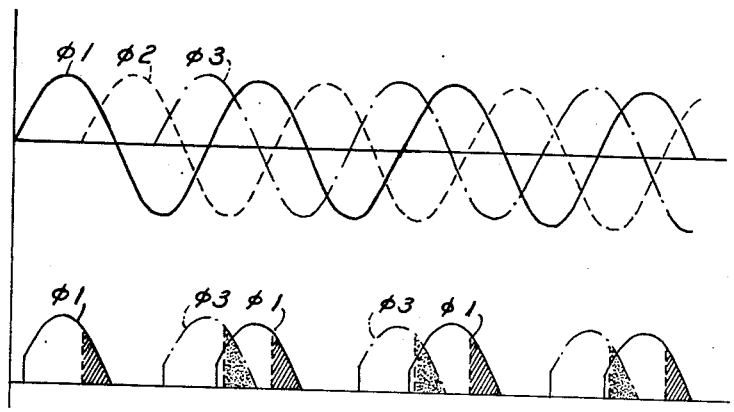
Figs. 3, 4 and 5 are graphs illustrating features of the invention.

It will be apparent, from the foregoing description, that there is a flow of rectified alternating current through mercury tubes 17, 18 for a timed period each time the motor is deenergized by opening main switch 11. Throughout the braking period, gas tubes 19 and 20 are triggered during the positive part of their respective alternating current cycles thereby igniting the mercury tubes 17, 18 and causing rectified alternating current to flow in the associated rectifier circuits. The relationship between the rectified alternating currents and the polyphase supply is best shown by Fig. 3 wherein the upper graph represents the phases of a three phase alternating current power supply and the lower graph shows the rectified alternating currents passing through the tubes 17 and 18.

The curves marked $\phi 1$ show the pulses passing through mercury tube 17 and curves $\phi 2$ represent the current carried by mercury tube 18. The areas under the full line curves represent a setting of potentiometers 35 and 36, Fig. 1, such that the triggering impulses controlled by the gas tubes 19, 20 occur early in the positive part of the alternating current cycle causing a large average braking current to flow through the rectifier currents. The shaded areas result from a setting of potentiometers 35 and 36 such that the triggering impulses controlled by the gas tubes 19, 20 are applied near the end of the positive cycles, causing a small average braking current to flow through the rectifier currents.

These braking currents are actually pulsating direct currents which when properly applied to a coasting three phase motor cause it to quickly stop. By observation it may be seen that the two phases of the mercury tube currents, while actually direct current, are also distorted alternating waveforms, one of which if connected to one phase of a motor coasting at full speed is capable of maintaining the motor in partial operation at full speed. However if the motor were to be slowed sufficiently, the fact that there is no true current reversal in the waveform would operate to prevent the motor from picking up or maintaining speed. Instead, the direct current nature of the applied power would then act to impede further rotation just as in the case of an eddy current brake, as is well known in the art. To effect the initial slow-down of the motor from full speed, the two pulsating direct current waveforms are applied in phase opposition to the rotation of the motor thus setting up an intermittently rotating, oscillating magnetic field which strongly impedes the rotation of the armature but which is incapable of initiating motor rotation. Then, once the motor has come to a stop, it is held strongly by the direct current component of the waveform.

Figure 2:
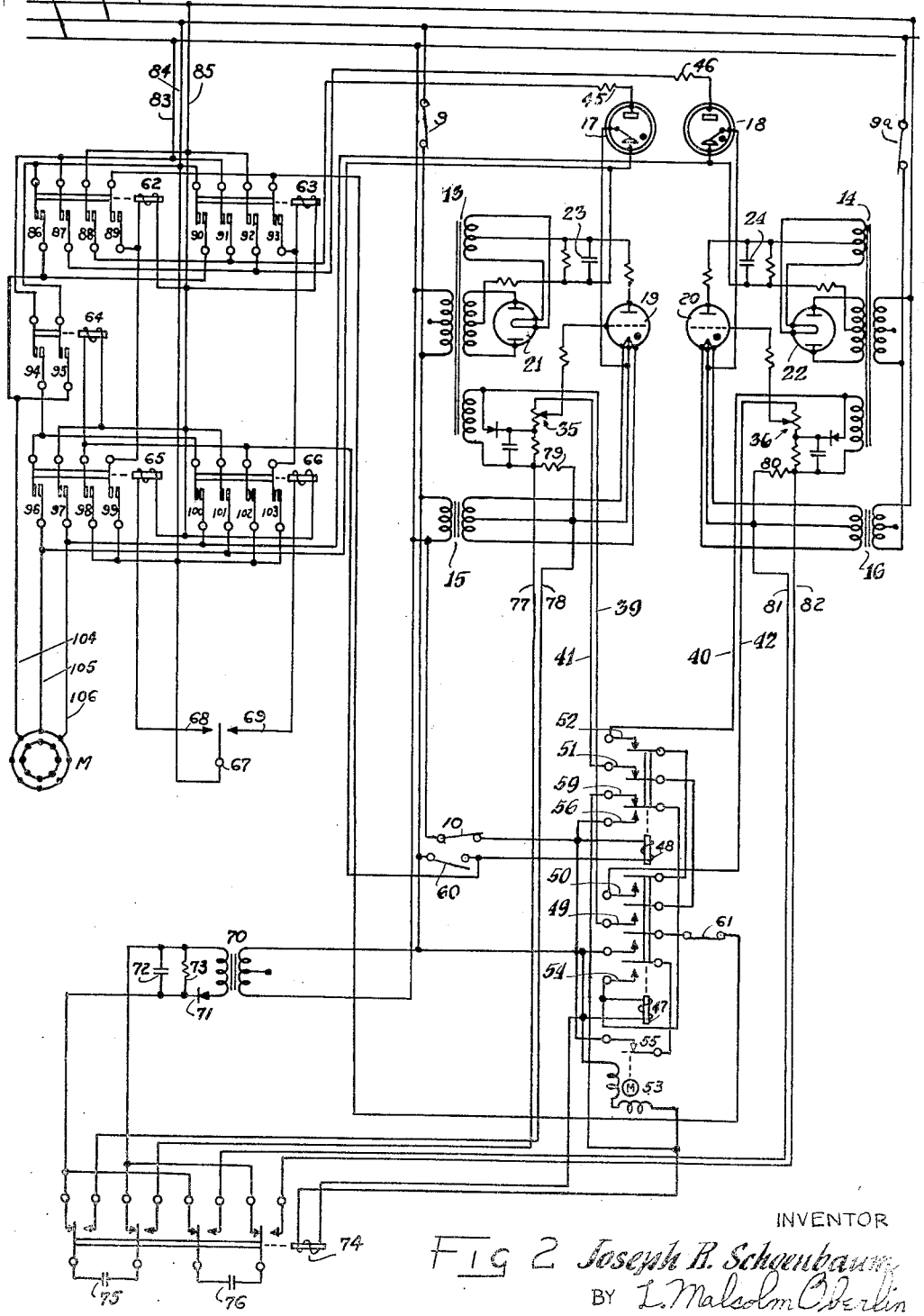
Fig. 2 is a schematic circuit diagram of an elevator control unit embodying my novel control and braking system.

Referring now to Fig. 2, the described braking and control unit is shown in combination with a conventional elevator control system and a device for progressively increasing the intensity of the braking current during the braking period.

In the elevator control system is included a three way switch 67 having a neutral position, a forward position 68, and a reverse position 69. The system further comprises a potential contactor or relay 64, a forward direction contactor or relay 65, and a reverse direction contactor or relay 66.

Assuming that switch 67 is moved to its forward position 68, forward contactor 65 is energized and the circuit of potential contactor 64 is closed through contacts 98. Thereupon, the motor windings are energized and the motor runs in a forward direction, conductor 104 being connected through contacts 95 and lead 84 to power supply conductor 2, conductor 105 being connected through contacts 96, 94 and lead 83 to power supply conductor 1, and conductor 106 being connected through contacts 97 and lead 85 to power supply conductor 3.

Responsive to the closure of relay 65, relay 48 is energized by a circuit including conductor 2, lead 84, contacts 98, the coil of relay 48, and conductor 1. Thereupon, relay 47 is also energized, as explained in connection with Fig. 1, placing the braking circuits in readiness for operation. Closure of relay 65 also completes a circuit through contacts 99 which energizes an auxiliary relay 62. Thereupon, an alternate circuit is established through contacts 86 connecting conductor 2 to motor lead 104 and the rectifier circuits are established for mercury tubes 17 and 18. Thus, the plate of mercury tube 17 is connected through dropping resistor 45, contacts 88, and lead 85 to conductor 3 while the cathode of tube 17 is connected to lead 105. The plate of mercury tube 18 is connected through dropping resistor 46, contacts 87 and lead 83 to conductor 1. Relay 62 further completes a holding circuit through contacts 89, normally closed switch 61 and the associated contacts of relay 47 so that relay 62 remains energized as long as relay 47 is closed.

It will be noted that the rectifier circuits just described are in phase opposition to the motor power supply circuits controlled by relay 65. Thus motor lead 105 is connected to conductor 1 when the power supply circuit through contacts 96 is closed. However, when the rectifier circuit is operative, lead 105 is connected through tube 17 and contacts 88 to conductor 3. Similarly, motor lead 106 is connected through the power supply circuit to conductor 3 and through the rectifier circuit to conductor 1.

Assuming that it is desired to stop the motor, switch 67 is moved from its forward position 68 to its neutral position. Thereupon, relays 64 and 65 are opened, thus opening the described power supply circuits through contacts 94, 95, 96 and 97. The opening of contacts 98 releases relay 48 but relay 47 remains closed responsive to the holding circuit described in connection with Fig. 1. With relay 48 open and relay 47 closed, the circuits between conductors 39, 41 and 40, 42 are closed thereby initiating operation of the gas tubes 19, 20. This causes rectified alternating current to flow through mercury tubes 17, 18 and the motor windings in phase opposition to the power supplied through contacts 94, 95, 96 and 97.

The timer 52 starts in response to the opening of relay 48 and braking current continues to be applied to the motor windings until the end of the timed cycle.

When the timed period is completed, contacts 55 are opened, thereby deenergizing relay 47 and relay 62. Responsive to the opening of these relays, the rectifier circuits are opened by contacts 87, 88 and the gas tubes 19, 20 together with the rectifier tubes 17, 18 are disabled by opening of the circuits between conductors 39, 41 and 40, 42. The system is now in its original condition in readiness for a new cycle of operation.

Assuming that switch 67 is now moved to its reverse position, reverse direction contactor relay 66 is energized which closes contacts 100, 101 and potential contactor 64. This completes suitable power supply circuits to reverse the phase connections of the motor and cause it to run in reverse direction, lead 104 being connected through contacts 95 and lead 84 to conductor 2, lead 105 being connected through contacts 101 and lead 85 to conductor 3, and lead 106 being connected through contacts 100 and 94, and lead 83 to conductor 1.

Responsive to the closure of relay 66, the circuit of relay 48 is closed with resultant closure of relay 47, and relay 63 is energized through contacts 103, a holding circuit being established through contacts 93 so that relay 63 remains closed as long as relay 47 is energized. The contacts 90 of relay 63 establish an alternate supply circuit between lead 104 and conductor 2. The closure of contacts 91, 92 establishes rectifier or braking circuits interconnecting rectifier tubes 17 and 18, the alternating current power supply, and the motor windings. Thus, the plate of rectifier 17 is connected through dropping resistor 45, contacts 91 and lead 83 to conductor 1 while the cathode of the tube is connected to lead 105. The plate of rectifier 18 is connected through dropping resistor 46, contacts 92 and lead 85 to conductor 3 while the cathode of the tube is connected to lead 106. The rectifier circuits are, accordingly, connected in phase opposition to the power supply circuits established through contacts 94, 95, 100 and 101.

When switch 67 is returned from its reverse position 69 to its neutral position, relays 64 and 66 are deenergized thereby interrupting the reverse direction power supply circuits. Also, relay 48 is opened which causes rectified alternating current to flow, for a timed period, to the motor windings in reversed phase relationship thereby to rapidly brake the motor. After the timed period, relays 63 and 47 are opened, returning the system to its original condition in readiness for a new cycle of operation.

It will be apparent, from the foregoing description, that the braking and control system of Fig. 1 is readily adaptable to an elevator control unit. In the elevator system, the two additional relays 62 and 63 are used to provide braking action in both directions of rotation of the motor. Thus, when switch 67 is returned to neutral position from either its forward position 68 or its reverse position 69, rectified alternating current is applied to the motor windings for a predetermined period, such current having the proper phase relationship to quickly brake the motor and bring it to a stop. The intensity of the braking current may be readily adjusted by the potentiometers 35, 36 to adapt the system to changing load conditions.

In most elevator systems, it is desirable to provide only a small braking torque at the beginning of the braking cycle, the torque progressively increasing as the braking cycle progresses. This feature prevents damage to the motor shaft or coupling means resulting from sudden application of full braking torque. I accomplish this result, in my novel elevator system, by controlling the bias on gas tubes 19 and 20 so as to gradually increase the intensity of the braking current during the braking cycle.

The bias control means is shown in Fig. 2 and comprises a pair of condensers 75 and 76, one for each side of the control and braking system. The condensers are controlled by a relay 74, the coil of which is connected in parallel with the coil of the timer 53. Accordingly, relay 74 is energized during the braking period when the timer 53 is energized and relay 74 is deenergized during the remainder of the cycle. When the relay 74 is deenergized, condensers 75 and 76 are charged by a circuit which includes a transformer 70 energized by one phase of the alternating current supply and a rectifier 71, together with resistor 73 and condenser 72 connected across the rectified output circuit of the transformer. When the relay 74 is energized at the start of the braking cycle, condenser 75 is connected by conductors 77, 78 to a resistor 79 which is included in the grid circuit of gas tube 19, and condenser 76 is connected by conductors 81, 82 to a resistor 80 which is included in the grid circuit of gas tube 20.

Figure 4:
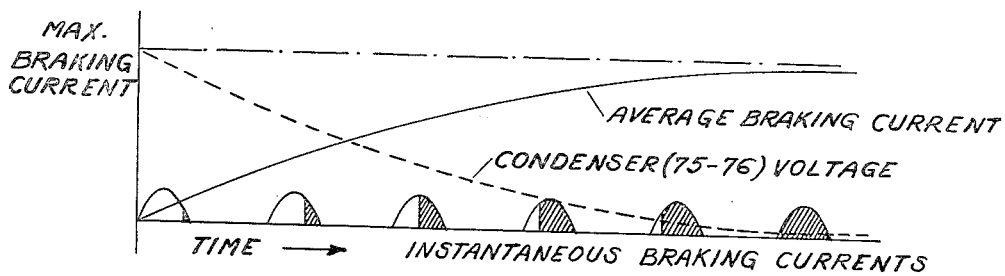

Accordingly, at the start of each braking cycle, relay 74 is energized and condensers 75, 76 produce an exponentially decreasing voltage across the resistors 79, 80 in the respective grid circuits of gas tubes 19 and 20. The polarity and size of the condensers 75, 76 is so adjusted that the bias on the gas tube grids is progressively decreased over a period of one-half second, for example. Consequently, the length of the rectified pulses passing through the gas tube controlled rectifiers 17, 18 is progressively increased as the discharge of the condensers continues. As a result, the intensity of the braking current and torque are small during the first part of the braking period and then progressively increase. This effect may be more fully understood by reference to Fig. 4 wherein the dashed line represents the voltage of condensers 75 and 76. As this voltage decreases exponentially, the grid bias on gas tubes 19, 20 decreases in a corresponding manner. Accordingly, the triggering impulses produced by the gas tubes occur earlier and earlier during the positive part of the cycle with the result that mercury tubes 17, 18 are energized for a progressively longer part of each cycle, as indicated by the portion of the graph showing instantaneous braking currents. This causes the average braking current, over a number of cycles, to increase exponentially as the braking cycle proceeds, thereby preventing damage to the motor shaft or coupling means which might result from too sudden application of full braking torque.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. The combination, with a polyphase power supply and an alternating current electric motor, of a control and braking system comprising means for connecting the windings of said motor in circuit with the respective phases of said power supply, a rectifier connected in circuit with one of said windings and one phase of said power supply, a second rectifier connected in circuit with another of said windings and a second phase of said power supply, said rectifier circuits being connected in phase opposition with the corresponding power supply circuits, and means for selectively energizing said power supply circuit and said rectifier circuits.

2. The combination, with a three phase power supply and an alternating current electric motor, of a control and braking system comprising switching means for connecting the windings of said motor in circuit with the respective leads of said power supply, a pair of braking circuits including connections reversed in phase relative to the connections made by said switching means between two of said windings and the leads of said power supply, a rectifier in each of said braking circuits, and control means for energizing and deenergizing said braking circuits.

3. The combination, with a polyphase power supply and an alternating current electric motor, of a control and braking system comprising switching means for connecting the windings of said motor in circuit with the respective phases of said power supply, a pair of rectifier circuits connected, respectively, in phase opposition to said power supply circuits, each rectifier circuit including a motor winding, one phase of said power supply, and an igniter controlled, mercury pool rectifier, and means for energizing the igniter of each mercury pool rectifier.

4. The combination, with a polyphase power supply and an alternating current electric motor, of a control and braking system comprising means for connecting the windings of said motor in circuit with the respective phases of said power supply, rectifier means connected in circuit with one of said windings and one phase of said power supply, second rectifier means connected in circuit with another of said windings and a second phase of said power supply, said rectifier circuits being connected in phase opposition with the corresponding power supply circuits, said rectifier means being deenergized during the negative part of each alternating current cycle and each rectifier means having a voltage responsive control element for initiating operation thereof, a transformer for impressing an alternating current component on said control element, a power source for impressing a direct current component on said control element whereby said control element is energized during each alternating current cycle, and means for varying the magnitude of said direct current component to change the percentage of each cycle during which the control element is energized.

5. The combination, with a polyphase power supply and an alternating current electric motor, of a control and braking system comprising means for connecting the windings of said motor in circuit with the respective phases of said power supply, rectifier means connected in circuit with one of said windings and one phase of said power supply, second rectifier means connected in circuit with another of said windings and a second phase of said power supply, the rectifier circuits being connected in phase opposition with the corresponding power supply circuits, each rectifier means including a gas filled tube having a voltage sensitive control grid for initiating operation thereof and having its plate connected to a source of alternating current whereby the tube ceases to be conductive during the negative part of each alternating current cycle, and means for initiating operation of said tube during each cycle comprising a current source for impressing an alternating current component and a direct current component on said control grid.

6. The combination, with an electric motor and an alternating current power supply, of an electronically controlled braking system comprising electronic rectifier means connected in circuit with said power supply and a motor winding, said rectifier means including a voltage responsive control element for initiating operation thereof, a transformer for impressing an alternating current component on said control element, a power source for impressing a direct current component on said control element whereby said control element is energized during each alternating current cycle, means for varying the magnitude of said direct current component to change the percentage of each cycle during which the control element is energized, a condenser connected to said control element, means for charging said condenser, and means for discharging said condenser over a number of cycles to exponentially increase the average time of energization of said rectifier means.

7. The combination, with an electric motor and an alternating current power supply, of an electronically controlled braking system comprising electronic rectifier means connected in circuit with said power supply and a motor winding, said rectifier means including a gas filled tube having a voltage sensitive control grid for initiating operation thereof and having its plate connected to a source of alternating current whereby the tube ceases to be conductive during the negative part of each alternating current cycle, means for initiating operation of said tube during each cycle comprising a current source for impressing an alternating current component and a direct current component on said control grid, and means for varying the ratio of said components to change the percentage of each cycle during which the tube is energized.

8. The combination, with an electric motor and an alternating current power supply, of an electronically controlled braking system comprising electronic rectifier means connected in circuit with said power supply and a motor winding, said rectifier means including a gas filled tube having a voltage sensitive control grid for initiating operation thereof and having its plate connected to a source of alternating current whereby the tube ceases to be conductive during the negative part of each alternating current cycle, means for initiating operation of said tube during each cycle comprising a current source for impressing an alternating current component and a direct current component on said control grid, a condenser connected to said control grid, means for charging said condenser, and means for discharging said condenser over a number of cycles to exponentially increase the average time of energization of said rectifier means.

9. The combination, with a polyphase electric motor and an alternating current power supply therefor, of an electronically controlled braking system comprising an igniter controlled mercury pool rectifier tube having its plate connected to one phase of said power supply and its cathode connected to a winding of said motor, said tube ceasing to be conductive during the negative part of each alternating current cycle, a gas tube having its plate connected to an alternating current supply and its cathode connected to the igniter of said mercury pool tube, said gas tube having a voltage sensitive control grid for initiating operation thereof thereby to energize said mercury pool tube, and a current source for impressing an alternating voltage on said control grid to initiate operation of said gas tube and said mercury pool tube during each cycle.

10. The combination, with a polyphase electric motor and an alternating current supply therefor, of means including a switch for connecting the windings of said motor with the respective phases of said power supply, rectifier means connecting certain windings of said motor to the power supply in phase opposition to their normal connection, relay means operable upon the opening of said switch to initiate operation of said rectifier means, and a timer for disabling said relay means after a predetermined period to terminate the operation of said rectifier means.

11. The combination, with a polyphase electric motor and an alternating current supply therefor, of means including a switch for connecting the windings of said motor with the respective phases of said power supply, rectifier means connecting certain windings of said motor to the power supply in phase opposition to their normal connection, a timer, a first relay operable upon closure of said switch, and releasable upon opening of said switch, a second relay operable upon closure of said first relay, a holding circuit for said second relay including the contacts of said timer, a circuit including contacts on said relays for energizing said rectifier circuits and starting the timer when the first relay is deenergized and the second relay is closed, the timer contacts opening, at the end of the timer cycle, to open said holding circuit, deenergize said second relay, and terminate the operation of said rectifier means.

12. The combination, with a polyphase electric motor and an alternating current supply therefor, of means including a switch for connecting the windings of said motor with the respective phases of said power supply, rectifier means connecting certain windings of said motor to the power supply in phase opposition to their normal connection, said rectifier means becoming non-conductive during the negative portion of each alternating current cycle, voltage sensitive control elements adapted to initiate operation of said rectifier means during each alternating current cycle, and a control system for cyclically applying a voltage to said control elements comprising an alternating current source, a timer, and a relay circuit to start said timer and connect said current source to the control elements when said switch is opened thereby to initiate operation of said rectifier means, said timer, at the end of its timing cycle, disconnecting said alternating current source from said control elements thereby terminating operation of said rectifier means.

13. The combination, with a polyphase electric motor and an alternating current supply therefor, of means including a switch for connecting the windings of said motor with the respective phases of said power supply, rectifier means connecting certain windings of said motor to the power supply in phase opposition to their normal connection, said rectifier means becoming non-conductive during the negative portion of each alternating current cycle, voltage sensitive control elements adapted to initiate operation of said rectifier means during each alternating current cycle, and a control system for cyclically applying a voltage to said control elements comprising an alternating current source, a timer, a condenser, means for charging said condenser before the start of the timing cycle, and means for discharging said condenser in circuit with said control element during the timing cycle thereby to exponentially increase the voltage applied to the control element and increase the average period of energization of said rectifier means.

14. In an elevator control and braking system, a polyphase induction type elevator motor, an alternating current supply therefor, a potential contactor, a switch having neutral, forward, and reverse positions, forward and reverse direction contactors to connect the motor windings to the current supply in a predetermined phase relationship for operation of the motor in one direction and to reverse said phase relationship for operation of the motor in the opposite direction, a plurality of rectifiers for supplying rectified alternating current from said current supply to certain windings of said motor, means cyclically energizing said rectifiers for a timed period when said switch is moved to its neutral position, relay holding means actuated by said forward direction contactor to apply rectified alternating current of reverse phase relationship to said windings when said switch is moved from forward to neutral position, and relay holding means actuated by said reverse direction contactor to apply rectified alternating current of said predetermined phase relationship to said windings when said switch is moved from reverse to neutral position.

15. In an elevator control and braking system, a polyphase induction type elevator motor, an alternating current supply therefor, a switch having forward, neutral, and reverse positions, a potential contactor, a forward direction contactor for connecting said current source to the motor windings in a first phase relationship, a reverse direction contactor for connecting said current source to the motor windings in a second phase relationship, a plurality of rectifiers for supplying rectified alternating current from said power supply to certain windings of said motor, means including a relay circuit and a timer for cyclically energizing said rectifiers for a timed period each time said switch is moved to its neutral position, relay holding means actuated by said forward contactor for connecting the rectifier output to the windings in said second phase relationship, relay holding means actuated by said reverse contactor for connecting the rectifier output to the windings in said first phase relationship, said relay holding means being deenergized at the end of each timing cycle, and means for varying the output of said rectifier means as the timing cycle progresses.

16. In an elevator control and braking system, a polyphase induction type elevator motor, an alternating current supply therefor, a switch having forward, neutral, and reverse positions, a potential contactor, a forward direction contactor for connecting said current source to the motor windings in a first phase relationship, a reverse direction contactor for connecting said current source to the motor windings in a second phase relationship, a plurality of rectifiers for supplying rectified alternating current from said power supply to certain windings of said motor, said rectifiers being deenergized during the negative part of each alternating current cycle, voltage sensitive elements for said rectifiers adapted to energize the same during the positive part of each alternating current cycle, means including a relay circuit, an alternating current source and a timer for cyclically energizing said voltage sensitive elements for a timed period each time said switch is moved to its neutral position, relay holding means actuated by said forward contactor for connecting the rectifier output to the windings in said second phase relationship, relay holding means actuated by said reverse contactor for connecting the rectifier output to the windings in said first phase relationship, said relay holding means being deenergized at the end of each timing cycle.

17. In an elevator control and braking system, a polyphase induction type elevator motor, an alternating current supply therefor, a switch having forward, neutral, and reverse positions, a potential contactor, a forward direction contactor for connecting said current source to the motor windings in a first phase relationship, a reverse direction contactor for connecting said current source to the motor windings in a second phase relationship, a plurality of rectifiers for supplying rectified alternating current from said power supply to certain windings of said motor, said rectifiers being deenergized during the negative part of each alternating current cycle, voltage sensitive elements for said rectifiers adapted to energize the same during the positive part of each alternating current cycle, means including a relay circuit, an alternating current source and a timer for cyclically energizing said voltage sensitive elements for a timed period each time said switch is moved to its neutral position, relay holding means actuated by said forward contactor for connecting the rectifier output to the windings in said second phase relationship, relay holding means actuated by said reverse contactor for connecting the rectifier output to the windings in said first phase relationship, said relay holding means being deenergized at the end of each timing cycle, a condenser connected to each of said voltage sensitive elements, means for charging said condensers before the start of each timed period, and means for discharging said condensers in circuit with the respective voltage sensitive elements during each timed period thereby to progressively increase the average output of said rectifiers.

18. The method of operating a polyphase electric motor having symmetrically distributed polyphase windings which consists in applying polyphase current, during an operating cycle, to the motor windings so that an equal phase difference exists between the currents in successive windings, and thereafter, during a braking cycle, interchanging the phases of the currents supplied to at least two of said windings while rectifying the last-mentioned currents.

19. The method of operating a polyphase electric motor having symmetrically distributed polyphase windings which consists in applying polyphase current, during an operating cycle, to the motor windings so that an equal phase difference exists between the currents in successive windings, thereafter, during a braking cycle, interchanging the phases of the currents supplied to at least two of said windings while rectifying the last-mentioned currents to provide pulsating direct braking currents which cause braking action until the motor stops and thereafter resist movement of the motor responsive to externally applied mechanical forces, and progressively increasing the duration of the direct current pulsations during the braking cycle.

20. The method of operating a polyphase electric motor having symmetrically distributed polyphase windings which consists in applying polyphase current, during an operating cycle, to the motor windings so that an equal phase difference exists between the currents in successive windings, thereafter, during a braking cycle, interchanging the phases of the currents supplied to at least two of said windings while rectifying the last-mentioned currents which cause braking action until the motor stops and thereafter resist movement of the motor responsive to externally applied mechanical forces, and progressively increasing the duration of the pulsations of the direct braking current in an exponential manner during the braking cycle.

21. The method of operating a three phase electric motor having symmetrically distributed windings which consists in applying three phase current, during an operating cycle, to the motor windings so that an equal phase difference exists between the currents in successive windings, and thereafter, during a braking cycle, interchanging the phases of the currents supplied to two of said windings while rectifying the last-mentioned currents to provide pulsating direct braking currents.

22. The method of operating a three phase electric motor having symmetrically distributed windings which consists in applying three phase current, during an operating cycle, to the motor windings so that an equal phase difference exists between the currents in successive windings, thereafter, during a braking cycle, interchanging the phases of the currents supplied to two of said windings while rectifying the last-mentioned currents to provide pulsating direct braking currents, and progressively increasing the duration of the direct current pulsations in an exponential manner during the braking cycle.

JOSEPH R. SCHOENBAUM.

REFERENCES CITED

The following references are of record in the file of this patent:

UNITED STATES PATENTS

| Number | Name | Date |
| --- | --- | --- |
| 1,376,453 | Meyer | May 3, 1921 |
| 1,911,356 | Eames | May 30, 1933 |
| 2,141,056 | Watkins | Dec. 20, 1938 |
| 2,222,947 | Harrison | Nov. 26, 1940 |
| 2,242,812 | Brown | May 20, 1941 |